E. HANUS.
CAGE FOR ANTIFRICTION BEARINGS.
APPLICATION FILED OCT. 13, 1913.
1,174,933.  Patented Mar. 7, 1916.
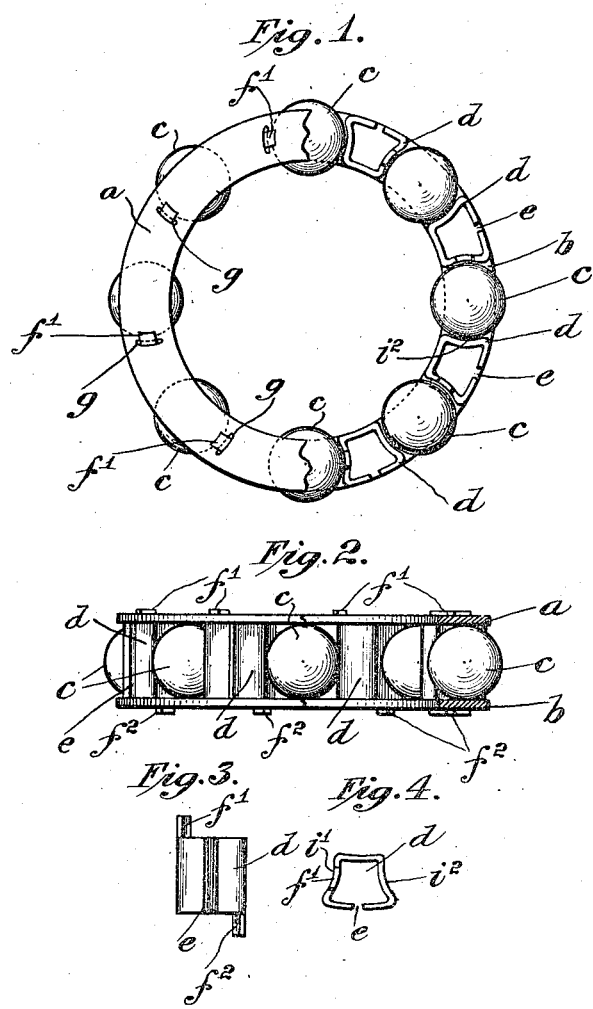

UNITED STATES PATENT OFFICE.

EWALD HANUS, OF TEGEL, NEAR BERLIN, GERMANY.

CAGE FOR ANTIFRICTION-BEARINGS.

1,174,933.   Specification of Letters Patent.   Patented Mar. 7, 1916.

Application filed October 13, 1913. Serial No. 794,798.

*To all whom it may concern:*

Be it known that I, EWALD HANUS, engineer, a subject of the King of Prussia, residing at No. 14 Treskowstrasse, Tegel, near Berlin, Germany, have invented certain new and useful Improvements in Cages for Antifriction-Bearings, of which the following is a specification, reference being had therein to the accompanying drawing.

This invention relates to anti-friction bearings, and has reference more particularly to the spacing cage usually employed therein to maintain the rolling elements of the bearing in spaced relations between the casing members.

A common type of cage comprises two opposing rings, and intermediate connecting devices arranged at intervals between the rings, and affording between them, seats for the rolling elements.

The aim of my invention is to produce a cage of this type which will possess such degree of flexibility, that a uniform distribution of the abnormal loads and undue shocks to which the parts may be in practice subjected will be assured, and the invention consists in so forming the connecting devices, and so attaching them to the two rings of the cage, that the rings will be permitted to yield resiliently in a circumferential direction relatively to each other.

The invention consists also in the details of construction and combination of parts hereinafter described and claimed.

In the accompanying drawings: Figure 1 is an elevation of a cage with the balls therein, one of the rings being cut away to expose other parts to view. Fig. 2 is an edge view of the same partly in section. Fig. 3 is an elevation of one of the connecting devices detached. Fig. 4 is an edge view of the same.

Referring to the drawings, my improved cage comprises opposing rings $a$ and $b$, which are provided at intervals with slots $g, g$, etc., the purpose of which will presently appear. Arranged between the rings at intervals are a series of connecting devices, consisting each of a tubular member $d$ slit longitudinally as at $e$, so as to form a resilient or yielding structure. At opposite ends these members are provided with lips $f^1$ and $f^2$ arranged respectively on opposite sides of the slit therein, and in the assemblage of the members between the rings, and their connection thereto, the lips $f^1$ are passed through the slots in ring $a$ and bent down thereon, and the lips $f^2$ are extended through the slots in ring $b$ and bent down thereon, with the result that the two rings will be firmly but resiliently connected together by said members. The sides of the several connecting members are concaved or curved inwardly as at $i^1$, $i^2$, so as to conform to the external curvature of the rolling elements $c$, which are inserted between the connecting members, by sufficient forcible pressure of the balls against the outer edges of the adjacent members, to cause them to yield circumferentially far enough to admit the balls. At their inner and outer sides the connecting members are curved to conform to the circumferential contour of the rings so that they will not project beyond the same. By reason of the fact that the connecting devices are individually resilient in a direction circumferentially of the ring, and by reason of the further fact that the said members are connected on opposite sides respectively with the two rings, the latter are elastically connected, and will be permitted to yield resiliently relatively to each other in a circumferential direction, the walls of the slits $e$ in such actions of the rings, approaching each other, and separating from each other. As a result, the cage as a whole will possess such flexibility, that a uniform distribution of abnormal loads and sudden shocks will be assured, and the parts will be prevented from breakage or injury.

While in the accompanying drawings and foregoing description I have set forth my invention in the detailed form which I prefer to adopt, it will be understood that the details may be variously changed without departing from the limits of the invention; and further it will be understood that the invention is not limited to any particular form or construction of the parts except in so far as such limitations are specified in the claims.

Having thus described my invention, what I claim and desire to secure by Letters Patent is:

1. A cage for antifriction bearings, said cage comprising two opposing rings, and a series of intermediate connecting devices serving to space the rolling elements of the bearing, each of said connecting devices comprising two portions yieldable one relatively to the other in a direction circumferentially of the rings, one of said rings being connected to one only of the two portions of each connecting device, and the other ring being connected only to the other portions of the connecting devices.

2. A cage for antifriction bearings, comprising opposing rings, and a series of intermediate connecting devices serving to space the rolling elements of the bearing, said devices consisting each of a tubular member having a longitudinal slit extending therethrough, the said members being connected at one end on one side of the slits therein with one ring, and being connected at the other end on the other side of the slits therein with the other ring.

3. A cage for antifriction bearings, comprising opposing rings formed with slots, and intermediate connecting devices arranged to space the rolling elements of the bearing and consisting each of a tubular member having a slit extending through the same, and said member being provided at opposite ends with lips located respectively on opposite sides of the slit, the lips at one end of said members engaging in the slots in one ring, and the lips on the other end of the members engaging in the slots in the other ring.

In testimony whereof I have affixed my signature in presence of two witnesses.

EWALD HANUS.

Witnesses:
　WOLDEMAR HAUPT,
　HENRY HASPER.